United States Patent Office 2,927,915
Patented Mar. 8, 1960

2,927,915
POLYMERIZATION PROCESS

Emory W. Pitzer, Bartlesville, Okla., assignor to Phillips Petroleum Company, a corporation of Delaware No Drawing. Application October 1, 1954
Serial No. 459,862

8 Claims. (Cl. 260—93.7)

This invention relates to the polymerization of polymerizable organic compounds. In one aspect it relates to a process for the production of unique polymers which range in properties from liquids and tacky semi-solids to brittle or flexible solids. In another aspect it relates to a process for polymerizing an olefinic compound in the presence of a catalyst prepared by a novel method.

This application is a continuation-in-part of my copending application Serial No. 363,411, filed June 22, 1953, now abandoned.

The copending application of J. P. Hogan and R. L. Banks, Serial No. 333,576, filed January 27, 1953, now abandoned, sets forth a method for the production of unique polymers by the polymerization of certain olefins in the presence of a catalyst comprising chromium oxide associated with at least one other oxide, such as silica and/or alumina. The present application provides a process of the type set forth in the Hogan and Banks application and effects increased conversions and yields by the use of a chromium oxide catalyst having a composition similar to that disclosed in the Hogan and Banks application but prepared by a novel method which is simple and which results in a catalyst having improved activity. The product polymers, more fully described in the cited application, are useful for making molded articles, pipe, protective coatings, and additives for lubricating oil.

According to this invention, a polymerizable unsaturated organic compound is polymerized by contacting with a chromium oxide polymerization catalyst comprising chromium oxide and at least one other oxide, said catalyst having been prepared by a method which comprises, as an essential step, grinding the components thereof to an average particle size of less than 5 microns and preferably less than 1 micron. The catalyst can be referred to as a "micronized" catalyst. The particle size referred to herein is determined by a sedimentation method wherein the size of the various particles of a finely divided solid is measured by their rate of sedimentation in a liquid and a statistical distribution curve of particle sizes is prepared. It will be clear to those skilled in the art that a powdered solid which has been ground to an average particle size less than 5 microns will contain some particles of a larger size however, these particles will necessarily be quite small and, according to this invention, it is preferred that not over 10 percent of the particles be of a size larger than 5 microns.

According to one embodiment of the invention, particulate alumina and chromium oxide are introduced in the desired proportions into a micronizing device such as a ball mill, a rod mill, a pebble mill, a pulverizer, or other attrition device, wherein the particle size is reduced by grinding, attrition, or other comminution until the average particle size, measured as previously described, is less than 5 microns and preferably less than 1 micron. During the comminution step the materials which are to become the components of the catalyst are thoroughly mixed so as to form an intimate homogeneous mixture. Alternatively, the materials can be separately and individually micronized to the prescribed size and then mixed together in any suitable mixing device until a homogeneous mixture is obtained. The mixture and/or micronization can be effected either with the materials in the dry state or the presence of added water or other suitable liquid which is nondeleterious to the resulting contact mass and to the micronizing or aggregate-forming steps. In most cases, it is presently preferred that the mixing and comminution be effected with the components in the dry or solid state, i.e. in the substantial absence of any liquid phase, since this method is simple and direct and involves a minimum of materials and operational steps.

Alternatively, the step of micronizing the materials for the catalyst of this invention can be effected by suspending particles of the dried materials, e.g. alumina and chromium oxide, in a stream of air or other gas in an attrition zone and maintaining the mixture in a state of agitation and attrition, preferably under dense-phase or hindered settling conditions, by the suspending and turbulent action of the gas until the desired amount of attrition and reduction in particle size has been obtained. The use of a mechanical pulverizer is often preferred, however, because it is more rapid.

After the formation of an intimate homogeneous mixture of the components of the contact mass in micronized form, the mixture is pelleted or otherwise agglomerated to form suitable aggregates for the contacting operation. Conventional pilling or pelleting methods or other aggregate-forming techniques can be utilized to form the catalysts of this invention when it is desired that the pellets or aggregates be relatively large, such as ¼″ by ¼″ cylinders, but where pills or pellets ⅛″ by ⅛″ and smaller are to be formed, it has been found desirable first to pellet the micronized material into, for example, ¼″ by ¼″ cylindrical pellets, with the aid of a suitable binder and lubricant, such as a hydrogenated vegetable oil or other combustible binder known in the art. When it is desired to form micronized material into small cylindrical pills, such as ⅛″ by ⅛″ or ⅛″ by ¹⁄₁₆″, it has been found preferable to use an indirect method on account of the resistance of flow of the material into the pelleting dies. It has been found difficult to cause micronized materials to flow into such dies so as to fill the dies completely before the material is compacted into pellets. By first pelleting the material into larger pellets and crushing or otherwise breaking up the pellets into 20 to 80 mesh particles, for example, the resulting small aggregates can then be readily caused to flow into pelleting dies so as to form ⅛″ by ⅛″ or smaller pellets.

Where it is desired to conduct the polymerization by a fluidized catalyst technique, the micronized particles according to this invention can be utilized as such; or small aggregates, suitable for this type of process, can be made by grinding pellets formed of micronized particles, according to this invention, to the required size, e.g. 100 to 200 mesh. A maximum particle size of 20 mesh is generally preferred. A size range of 20 to 100 mesh is further preferred.

As previously indicated, according to this invention, the catalytic components are admixed together in the desired proportions and micronized in an pparatus such as ball, rod, tube, or hammer mill until the average particle size of the material is smaller than 5 microns and preferably smaller than 1 micron. In any event, a substantial quantity of the ground material is as fine as 0.01 micron. The micronization can be carried out either wet or dry, with or without the use of a lubricant, with recycling of the coarser particles to the comminution step for further reduction in size. If desired, a lubricant can be utilized in the comminution step, in which case the lubricant should be one which facilitates the pilling of the material without deleterious effect on the comminution or the catalyst activity. Examples of suitable lubricants are graphite, hydrogenated vegetable oil, such as hyrogenated corn oil (Sterotex), hydrogenated peanut oil, and hydrogenated cotton seed oil. The amount of lubricant employed can vary from a few (e.g. 1 or 2) percent up to about 10 weight percent or more of the materials being micronized, but amounts which appreciably reduce catalytic activity, for example, by giving rise to excessive temperatures during the subsequent combustion, should be avoided. Such amounts can be determined by trial in any particular case. When combustible lubricant is used in the micronizing step in proper quantity, the use of additional lubricant in the subsequent pilling step is often not required. After the pilling or pelleting operation, the lubricant is removed by heating the pills in an oxygen containing atmosphere to a temperature of, for example, about 1000° F. within a period of 3 hours and maintaining that temperature for a period of, for example, 20 hours or longer. Combustion of the lubricant at higher or lower temperatures is also feasible, but care should be taken not to overheat the catalyst so as to impair its activity.

The reason for the superiority of the catalysts prepared by the method of this invention is not well understood. It is possible that the fineness of the particle size alone is responsible for the improved activity or that the improvement is due to surface characteristics imparted to the minute particles by micronizing. At any rate, the catalysts of this invention in which the particulate raw materials have been micronized produce superior results in contacting operations, when these particles have been formed into aggregates, as compared with the same materials formed into catalysts according to previously known methods. Catalyst activity is most instances is closely related to surface characteristics of the catalytic material and it is possible that the micronizing favorably affects the catalyst surface characteristics of the particles.

The starting materials for the catalysts utilized in this invention are chromium oxide and at least one other oxide, which when composited or associated with chromium oxide forms a catalyst which is active for the polymerization of polymerizable organic compounds. The chromium oxide can initially be utilized in any of the oxidation states known in the art; however, it is preferred to utilize chromium trioxide (CrO₃) as a starting material. The accompanying oxide or oxides are most frequently selected from the group consisting of silica and alumina, although other oxides are operative. The silica is preferably utilized in the form of a gel. The alumina can be utilized in the form of precipitated alumina gel, activated alumina, or bauxite. Although it is ordinarily preferable that the silicon or aluminum oxide be utilized in the state of hydration in which it is finally to appear in the finished catalyst, it is often more practical to use hydroxides or hydrated or hydrous oxides, such as, for example, alumina trihydrate, as the starting material. Materials which are often preferred as a catalyst component in addition to chromium trioxide, according to this invention, are composites of silica and alumina. The silica and the alumina can vary in proportions in such a composite over a very wide range, for example, from 0.5 weight percent silica up to 99.5 percent silica, the remainder being alumina. A very satisfactory material is a commercially available cracking catalyst in the form of a coprecipitated composite gel of silica and alumina comprising about 90 weight percent silica and about 10 weight percent alumina. A composite prepared by impregnating partially dried silica gel with a solution of an aluminum salt and subsequently drying and igniting can likewise be used. It is also within the scope of this invention to utilize alumina and/or silica which has been pretreated with HF, as set forth in the cited copending application of Hogan and Banks.

It is also within the scope of this invention to include, as a catalyst component, in addition to those already mentioned, strontium oxide, as more fully described in the copending application of Hogan nad Banks, Serial No. 433,804, filed June 1, 1954, now Patent No. 2,846,425.

The catalyst of this invention should contain at least 0.1 and ordinarily not over 10 weight percent chromium in the form of chromium oxide. Larger amounts of chromium oxide can be used, but appear to add substantially no activity to the catalyst. It is ordinarily preferred that the chromium (Cr) content be within the range 0.5 to 10 weight percent. At least 0.1 weight percent of the catalyst should be hexavalent chromium. The presence of hexavalent chromium can be assured by utilizing chromium trioxide as the starting material and/or as a step (usually the final step) in the catalyst preparation, activating the catalyst in dry air at a temperature in the range 650 to 1500° F. for from 1 to 10 hours. It is preferable that the temperature be controlled within the range 900 to 1100° F., more preferably 900 to 1000° F., during the activation treatment. A stream of dry air or oxygen can be passed through or over the catalyst during the activation treatment. By "dry air," as used herein, is meant air in which the partial pressure of water is less than 0.1 mm. of mercury. The air is preferably anhydrous in so far as this state can be practically attained.

Reactants suitable for use in the polymerization process of this invention include monoolefins and diolefins. In order to produce a solid or tacky polymer, it is necessary that the feed olefin be an aliphatic 1-olefin having a maximum chain length of 8 carbon atoms and no chain branching nearer the double bond than the 4-position. Examples of such 1-olefins are ethylene, propylene, 1-butene, 1-pentene, 1-hexene and 5-methyl-1-hexene. It is also within the scope of this invention to copolymerize one or more olefins, for example, to prepare a copolymer of ethylene and propylene. Olefins other than 1-olefins can be polymerized in the presence of the catalyst of this invention, but form liquid polymers and very little, if any, solid polymer. Examples of such olefins are 2-butene, and 2-methyl-2-pentene.

It is usually desirable to utilize a solvent in the process of this invention as a reaction medium and/or a medium for the recovery of polymer. Suitable solvents are hydrocarbons which are liquid and chemically inert under the reaction conditions. Such solvents are paraffins, such as those having from 5 to 12 carbon atoms, for example, 2,2,4-trimethylpentane (isooctane), normal hexane and normal decane. A preferred class of solvents are naphthenic hydrocarbons such as cyclohexane and methylcyclohexane, as set forth in more detail in the copending application of W. C. Lanning, Serial No. 450,225, filed August 16, 1954, now abandoned.

The contacting of the reactants with the catalyst can be effected by methods known in the art. One method comprises dissolving the reactant olefin in a solvent of the type described and contacting the resulting solution in the liquid phase with the catalyst. In this method of operation, a solution of from 1 to 20 weight percent of the olefin in the solvent is generally preferred. Another method comprises contacting the olefin in the gaseous or vapor phase with the catalyst, whereby substantially all of the solid polymer accumulates on the surface of the catalyst and is removed in a subsequent step by the use of a solvent of the type described. This type of operation is set forth in more detail in the copending application of G. T. Leatherman and C. V. Detter, Serial No. 433,801, filed June 1, 1954, now abandoned. The use of a moving or gravitating bed or a fluidized fixed bed of catalyst is also within the scope of this invention. Another method of contacting comprises suspending the catalyst (e.g. 20 to 50 mesh) in the solvent in which the feed olefin is dissolved and reacting the mixture in a reactor provided with a stirrer which maintains the catalyst in suspension. The polymer is later completely dissolved in the solvent and recovered therefrom by distillation or by cooling followed by filtration. In any event, the product polymer can be recovered from solution in the solvent by flashing, distillation, or cooling and filtration.

The polymerization conditions, in general, comprise a temperature in the range 150 to 450° F., a pressure in the range 0 to 700 p.s.i. and a liquid hourly space velocity in the range 0.1 to 20, preferably 1 to 10, or an equivalent space velocity when the reaction is conducted in the gaseous phase. When ethylene is the reactant olefin and the catalyst is used in the form of a stationary or fixed bed, a temperature in the range 275 to 375° F. is preferred. When ethylene is the reactant olefin and a mobile catalyst, e.g. in the form of a suspension in a liquid solvent, is used a temperature in the range 200 to 350° F. is preferred. Temperatures in the upper part of the latter range produce a brittle polymer whereas those in the lower part of said range produce a relatively flexible polymer. When the reactant olefin is propylene or a higher olefin, the preferred reaction temperature is in the range 150 to 250° F. When the olefin is reacted in admixture with a hydrocarbon solvent, a pressure sufficient to maintain the reaction mixture preponderantly in the liquid phase is satisfactory. This pressure is ordinarily in the range 100 to 600 p.s.i.

It is within the scope of the present invention to conduct polymerization in the presence of a catalyst having the chemical composition as described herein and prepared by first utilizing a conventional method such as impregnation of a carrier with, for example, an aqueous solution of chromic acid, followed by comminution of the resulting composite to an average particle size of less than 5 microns and subsequent re-aggregation according to this invention. Thus the activity of a catalyst which has been prepared by other methods can be improved by the method of this invention.

After a period of use, the activity of the catalyst declines, even when most of the deposited polymer has been recovered by treatment of the catalyst with a solvent. When the decline in activity reaches such a point that the conversion per pass reaches an undesirably low level, the catalyst can be regenerated by contact with an oxidizing gas such as air, which can be diluted with an inert gas. The removal of organic matter by combustion is preferably followed by an activation treatment as previously described herein.

Commercially available olefins, particularly ethylene, often contain small amounts of impurities, such as oxygen, which are deleterious to the catalyst of this invention. It is preferred that oxygen be removed as nearly completely as practical, although small amounts can be tolerated if necessary. Oxygen can be removed from the ethylene feed by contacting with an oxygen-absorbing material such as metallic copper, metallic iron, magnesium or alkali metals.

Example

A micronized catalyst was prepared by utilizing a commercially available cracking catalyst prepared by coprecipitating silica and alumina in the form of a mixed gel containing 90 weight percent silica and 10 weight percent alumina. Pellets of this material were milled in a one-gallon ball mill for 32 hours. 870 grams of the resulting powder, which had a particle size smaller than 230 mesh, was mixed with 41.7 grams of granular solid chromium trioxide and the mixture was milled in a ball mill for 14 hours. The resulting powder had an average particle size less than 5 microns. The powder was formed into pills using Sterotex as a lubricant and binder. The pills were cylindrical in shape and were ⅛" in length and ⅛" in diameter. They were prepared by the use of a Stokes BB-2 pilling machine. The micronized mixture was first pelleted on the machine to form ¼" by ¼" cylindrical pellets. These were ground to 20–100 mesh size and subsequently formed into ⅛" by ⅛" pellets by use of the pilling machine. The resulting pellets were heated at approximately 900° F. in an oxygen-nitrogen mixture containing 2 volume percent oxygen until the Sterotex had been removed by combustion. The resulting catalyst was activated by heating in dry air at 950° F. for 6 hours.

A second catalyst was prepared by impregnating another portion of the previously described original silica-alumina pellets with an aqueous solution of chromium trioxide followed by drying and activating by heating in dry air as previously described.

Each of the above catalysts contained 2.5 weight percent chromium in the form of chromium oxide.

Two polymerization runs were made, in each of which each of the catalysts above described was used to polymerize ethylene at 330° F., 450 p.s.i. and a liquid hourly spaced velocity of 6. The catalyst was utilized in the form of a fixed bed of the pellets. The feed mixture comprised 2.0 weight percent ethylene, 0.6 weight percent ethane and 97.4 weight percent isooctane (2,2,4-trimethylpentane). The duration of each polymerization run was 12 hours. The micronized catalyst prepared according to this invention, effected an ethylene conversion of 96 percent per pass, whereas the second catalyst, prepared by impregnation with an aqueous solution, effected a conversion of 93 percent per pass. Since the increase in conversion exhibited by the catalyst of this invention occurred at a conversion level which was already high, a very substantial increase in the catalyst activity resulting from the catalyst prepared according to this invention is indicated.

The polymer produced by the micronized catalyst of this invention, which polymer was recovered by distilling off the isooctane solvent and recovering the residue, had a molecular weight of 14,100, as determined by measuring the intrinsic viscosity of a solution of the polymer in tetralin; a density (20° C.) of 0.955; a melting point of 246° F.; and an impact strength of 0.102 foot-pounds, as measured by the falling-ball test. This test comprises causing a steel ball of known weight to fall from a measured height vertically onto a molded disc of the polymer and measuring the minimum height of fall necessary to shatter the disc. This was a height of 6 inches in the case of the polyethylene product of the run according to this invention.

The product of the run utilizing the solution-impregnated catalyst had properties similar to those set forth above.

The improved activity of the catalysts of this invention is demonstrated by the increased conversion obtained in the run described above.

In like manner, propylene, a mixture of ethylene and propylene, or 2-butene can be polymerized. For propylene and for 2-butene, the temperature is 220° F. The polymer formed by 2-butene is substantially completely liquid.

From the foregoing it will be seen that I have provided an improved polymerization process which comprises contacting a polymerizable organic compound, preferably at least one 1-olefin having a maximum chain length of 8 carbon atoms and no branching nearer the double bond than the 4-position at polymerization conditions of temperature and pressure, with a composite chromium oxide catalyst prepared by a method which comprises grinding the components of the catalyst to an average particle size less than 5 microns. While certain compositions, process steps and examples have been described for purposes of illustration, it is clear that the invention is not limited thereto.

I claim:

1. A process which comprises polymerizing a polymerizable aliphatic olefin in the presence of a chromium oxide composite polymerization catalyst prepared by a method which comprises grinding chromium oxide and at least one oxide selected from the group consisting of silica and alumina, which, in association with said chromium oxide, forms a catalyst which is active for polymerization of said olefin, to an average particle size of less than 5 microns, pelleting the resulting ground catalyst, crushing the resulting pellets to a particle size of 20 to 80 mesh, and repelleting the crushed catalyst, the polymerization being conducted at a temperature and at a pressure suitable to initiate polymerization of said compound.

2. The process of claim 1 wherein said polymerizable olefin is a 1-olefin.

3. The method of claim 1 wherein said olefin is ethylene.

4. A process for polymerizing an aliphatic 1-olefin which comprises contacting said olefin with a catalyst consisting essentially of chromium oxide, silica and alumina, said catalyst being active for said polymerization, said catalyst having been prepared by grinding the mixture of said oxides to an average particle size less than 5 microns, not over 10 percent of the ground particle having a particle size greater than 5 microns, pelleting the ground mixture of oxides, crushing the resulting pellets to a particle size or 20 to 80 mesh, and repelleting the crushed catalyst, the catalyst containing 0.1 to 10 weight percent chromium as chromium oxide, at least 0.1 weight percent of said catalyst being hexavalent chromium, the polymerization being conducted at a temperature in the range of 150 to 450° F., and recovering a resulting polymer.

5. The process of claim 4 wherein said olefin is ethylene and solid polyethylene is recovered as a product.

6. The process of claim 4 wherein said olefin is propylene.

7. The method of claim 4 wherein said olefin is 1-butene.

8. The method of claim 4 wherein said olefin is 1-pentene.

References Cited in the file of this patent

UNITED STATES PATENTS

| | | |
|---|---|---|
| 1,345,323 | Frazer et al. | June 29, 1920 |
| 2,332,276 | Stahly | Oct. 19, 1943 |
| 2,397,301 | Vesterdal | Mar. 26, 1946 |
| 2,432,686 | Cummins | July 8, 1947 |
| 2,585,033 | Pitzer | Feb. 12, 1952 |
| 2,650,202 | Hawes | Aug. 25, 1953 |
| 2,691,647 | Field et al. | Oct. 12, 1954 |
| 2,727,023 | Evering et al. | Dec. 13, 1955 |
| 2,825,721 | Hogan et al. | Mar. 4, 1958 |

OTHER REFERENCES

Owen: Jour. Amer. Chem. Soc., vol. 69, 1947, pages 2559 and 2560.

Gregg: The Surface Chemistry of Solids, Reinhold, 1951, pages 64, 65, 265, and 266.